Dec. 16, 1952           L. A. DICKENS           2,621,969
VALVE
Filed Feb. 6, 1951                                       2 SHEETS—SHEET 1
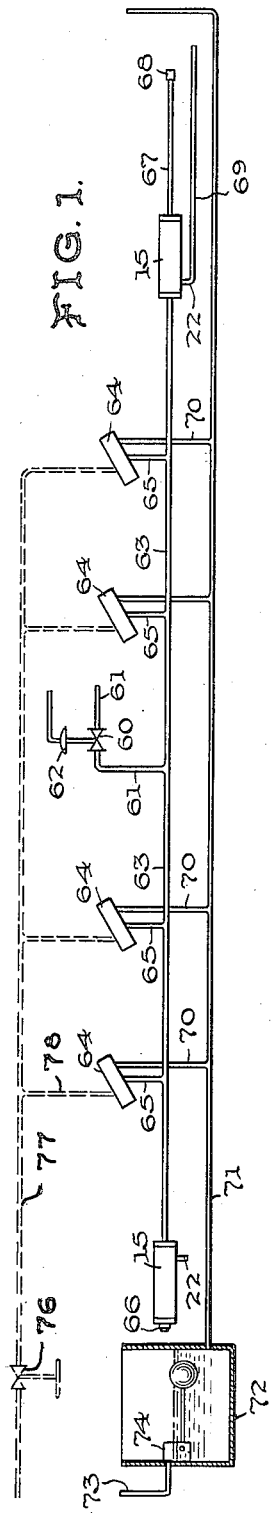
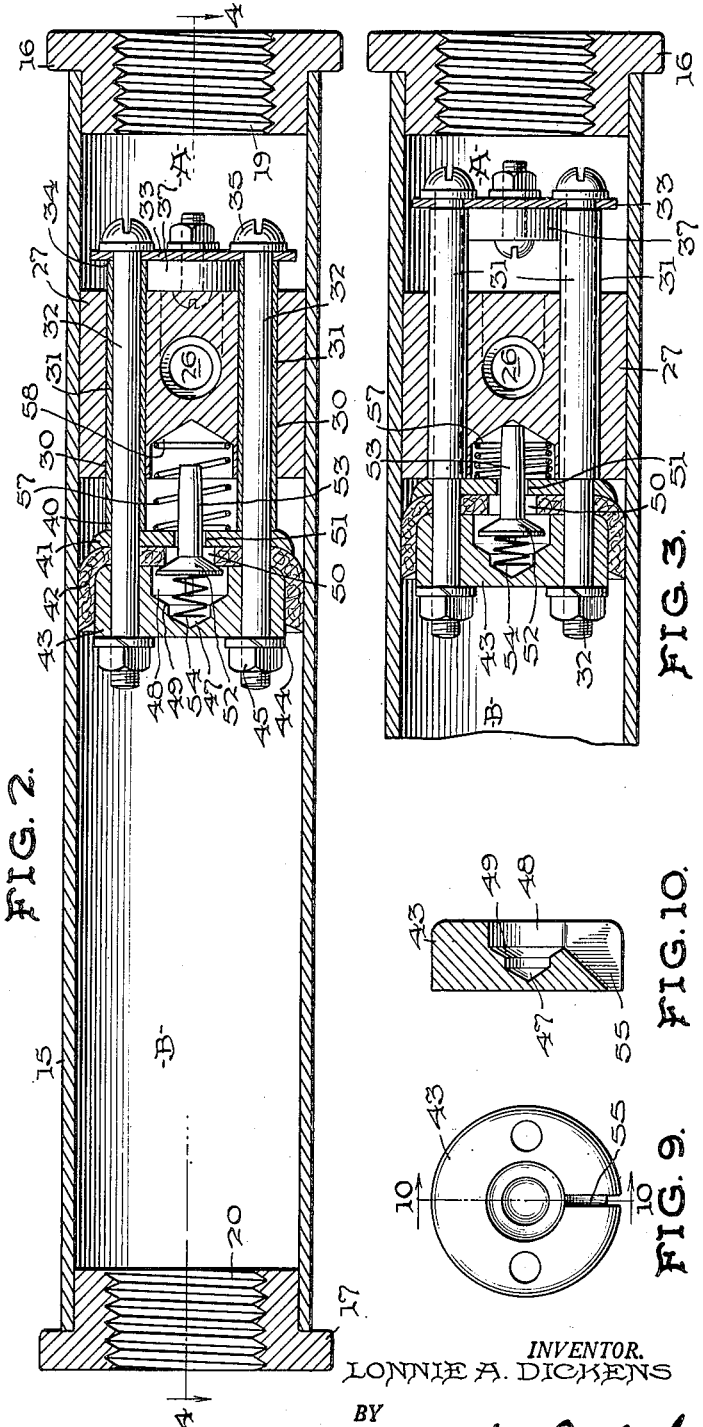
INVENTOR.
LONNIE A. DICKENS
BY
Estabrook & Estabrook
ATTORNEYS Dec. 16, 1952  L. A. DICKENS  2,621,969
VALVE
Filed Feb. 6, 1951  2 SHEETS—SHEET 2
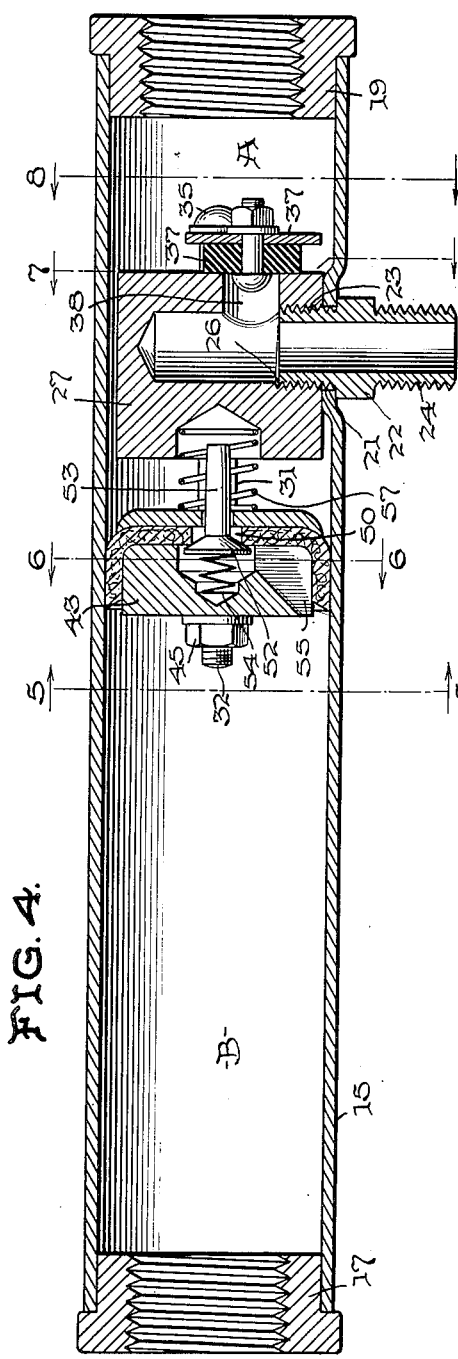
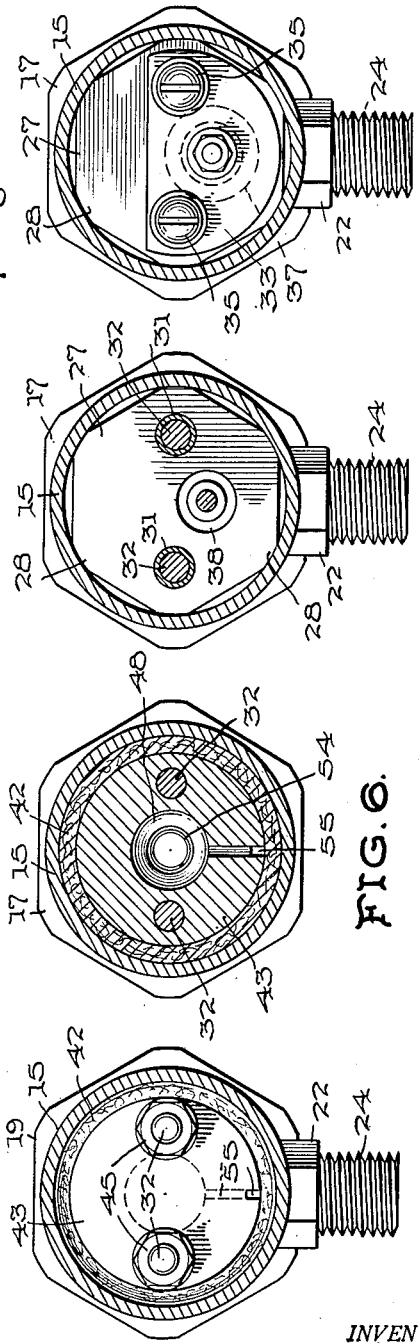
INVENTOR.
LONNIE A. DICKENS
BY Estabrook & Estabrook
ATTORNEYS Patented Dec. 16, 1952

2,621,969

UNITED STATES PATENT OFFICE 2,621,969

VALVE

Lonnie A. Dickens, Charlotte, N. C., assignor to White and Company, Inc., Charlotte, N. C., a corporation of North Carolina Application February 6, 1951, Serial No. 209,649

8 Claims. (Cl. 299—86)

This invention relates broadly to valves and more specifically to an automatic blow-off valve for use in an air line of a humidification system.

In recent years the problem of controlled humidification in manufacturing plants has become of paramount importance. This is particularly true in the textile industry, wherein a great many plants engaged in the processing of textiles are located in relatively warm climate areas. The location of the manufacturing plant is not necessarily the primary reason for requiring the use of a controlled humidification system, as the heat derived from the textile machinery, and other sources in a plant, tend to raise the temperature to a point above that considered proper and adequate for human comfort and health.

One of the more commonly used methods of supplying the humidity to the air space in the manufacturing plant is through the use of atomizer heads. An atomizer head is similar to a nozzle and has a small Venturi-like orifice through which compressed air is forced and which air is mixed with water so as to break up into a fine mist as it leaves the atomizer head structure. This mist vaporizes and raises the water content of the surrounding air thus cooling the air and reducing the temperature.

The humidification systems generally found in present day usage may be classified into two groups, namely, a low pressure system and a high pressure system. The low pressure system utilizes a water tank having a float valve for controlling the water level in the tank. The water flows from the tank, by gravity, to the atomizer heads where it is drawn into the head by the air stream flowing therethrough due to the Venturi construction in the atomizer head. In the high pressure system water is delivered under pressure to the atomizer heads where it is entrained with the air stream and ejected from the atomizer heads as a fine mist. The valve of the present invention is capable of being used with either a low pressure or a high pressure system.

One of the most troublesome conditions arising in present day humidification systems employing atomizer heads is the accumulation of water in the air lines. When a quantity of water has accumulated in the air lines the water is forced, by the air pressure, through the air orifice of the atomizer head where it is ejected as a stream of water rather than a fine mist. Another difficulty with present day systems is found to exist when the air stream to the atomizer heads is shut off.

In the majority of systems the air stream to the atomizer heads is automatically turned off and on depending upon the surrounding conditions. When the air stream to the atomizer heads is cut off the heads continue to draw water as the pressure in the air lines gradually lowers, however the lowered air pressure stream causes the atomizer heads to eject either a solid stream or a heavy spray rather than a fine mist. This condition occurs quite frequently over a period of time due to the air stream being turned off and on as necessitated by atmospheric requirements. The stream of water ejected by the atomizer heads under these conditions is commonly referred to in the textile industry as a wetting down and in many instances the stream of water strikes not only the workers but also equipment and products being manufactured resulting in unpleasant working conditions and damage to products and machinery.

A number of attempts have been made to reduce or overcome the wetting down problem which results from water accumulating in the air supply lines. One of the heretofore adopted methods has been to install in the air supply lines hand operated valves. The hand operated valves are installed at the ends or the lowest points in the air supply lines and are manually operated, when air is being delivered to the atomizer heads, for the purpose of clearing the lines of accumulated water. Such hand operated valves are commonly referred to in the textile industry as blow-off valves. In the use of a system embodying hand operated blow-off valves it is necessary to have a person devote his full time to opening and closing said valves. Such an arrangement is highly undesirable.

Another type of valve that is employed in certain humidification systems for reducing or controlling the wetting down condition is a valve that is commonly referred to in the industry as a free-blow valve. This valve operates to shut off the air supply line in the same manner as the conventional automatic shut-off valve and at the same time opens a port in the valve for exhausting the remaining air in the air line. This type of valve only partially corrects the wetting down condition as it does not remove all of the water that has accumulated in the air lines. The reason being that during operating periods the air in the air lines carries droplets of water away from the valve towards the ends of the air supply lines, so that when the valve closes and the port opens the air adjacent the valve port is exhausted and the air at the ends of the lines rushes back towards the port. As the air moves through the pipe lines toward the port it also carries the entrapped water part of the way with it so that some of the water always remains in the lines and thus creates a condition resulting in a wetting down when the air stream is turned on again in the air supply lines.

The valve of the present invention is adapted to not only overcome the difficulties and disadvantages found to exist in the aforementioned valves but is designed to operate efficiently and automatically in the air supply lines of a humidification system.

One of the objects of the present invention is to provide a valve for effectively and instantaneously reducing the pressure in an air supply line when the air supply is cut off.

Another object of the present invention is to provide a valve in an air line of a humidification system for effectively blowing off the air line in the same direction as the normal travel of air through said line.

Another object of the present invention is to provide a valve in an air line of a humidification system for draining or sweeping from said air line all accumulated water therein.

Another object is to provide a valve for an air line of a humidification system having a spring actuated plug member for controlling the discharge of air and water from the air line.

A still further object is to provide a valve for an air line of a humidification system having a pressure actuated member for opening and closing the discharge port of said valve.

Still other objects are to provide a valve which is simple in design, economical of manufacturing and efficient and reliable in service.

Other objects and advantages more or less ancillary to the foregoing and the manner in which all of the various objects are realized will appear in the following description, which considered in connection with the accompanying drawings, sets forth the preferred embodiment of the invention.

Referring to the drawings wherein the preferred embodiment of the invention is illustrated:

Figure 1 is a diagrammatic view of a portion of a humidification system showing two valves of the present invention; the portion of the figure in full lines denoting a low pressure system and the portion in broken lines denoting a high pressure system;

Figure 2 is a longitudinal sectional view showing the valve in a closed position;

Figure 3 is a longitudinal sectional view of the valve in its open position with a portion of the valve housing removed;

Figure 4 is a longitudinal sectional view taken on line 4—4 of Figure 2 and showing the valve in its closed position;

Figure 5 is a transverse sectional view taken on line 5—5 of Figure 4 and showing one end of the valve;

Figure 6 is a transverse sectional view taken on line 6—6 of Figure 4 and showing a portion of the valve with an escape port therein;

Figure 7 is a transverse sectional view taken on line 7—7 of Figure 4 and showing the body of the valve and discharge passage;

Figure 8 is a transverse sectional view taken on line 8—8 of Figure 4 and showing an end of the valve;

Figure 9 is an end view of the reciprocating portion of the valve with the spring and plug member removed; and Figure 10 is a vertical sectional view of the portion of the valve shown in Figure 9, the section being taken on line 10—10 of Figure 9.

Referring to the drawings, where in Figure 2, there is shown a tubular metal housing 15 formed preferably of a relatively soft metal such as copper. The housing 15 has bushings 16 and 17 secured in the ends thereof, such as by soldering, and the bushings are drilled and tapped to provide threaded apertures 19 and 20 for mounting the housing in or at an end of a pipe line as shown in Figure 1. An aperture 21, Figure 4, is formed in the housing 15 adjacent the bushing 16, for receiving an exhaust fitting or outlet port member 22 which is formed with external threads 23 and 24 adjacent its respective ends. The threaded end 23 of the port member 22 extends into a threaded recess or passage 26 formed in a valve body or member 27 of the valve mechanism for positioning and anchoring the valve mechanism within the tubular housing 15.

The valve body 27 of the valve mechanism is of a hexagonal configuration, Figures 4 and 7, thus defining passage ways between the valve body and housing 15. The corners 28 of the valve body 27 are rounded or beveled to insure the valve body having a smooth sliding fit within the housing 15. The threaded recess 26 formed in the valve body 27 extends inwardly from one of the flat side faces of the valve body so that the threaded end 23 of the outlet port member 22 may draw the valve body 27 and housing 15 together into a tight fit. As shown in Figure 4 the portion of the housing 15 surrounding the aperture 21 is slightly deformed when the valve body is drawn into engagement with the housing so as to insure a tight surface engagement between these two elements.

The valve body 27 is formed with two diametrically disposed passages 30, Figures 2 and 3, which extended throughout the length of the valve body on opposite sides of the recess 26. The passages 30 are adapted to receive tubes or sleeves 31 which are of such a length as to extend beyond the ends of the valve body 27. The tubes 31 are of a slightly smaller diameter than the passages 30 so as to insure the tubes having a sliding fit with respect to the valve body 27. The tubes 31 support bolts or rods 32 which are of a greater length than said tubes. A plate 33 carried by the bolts 32 is interposed between the end 34 of the tubes 31 and the heads 35 of the bolts. A resilient valve disc or closure member 37 is mounted on the plate 33, intermediate the tubes 31, and is adapted to engage the valve body 27 for closing a valve port 38, Figure 4, formed in said valve body. The valve port 38 terminates in the recess 26 and provides communication between the interior of the housing 15 and the outlet port member 22.

The portion of the rods 32 which project beyond the end 40 of the sleeves 31 have a cup shaped metallic disc member 41 mounted thereon which disc member is adapted to receive a cup shaped washer 42 that is supported on said rods. A cylindrically shaped cup filler or plug member 43 is mounted on the rods 32 within the washer 42. The cup shaped washer 42 while preferably formed of leather may be of any relatively soft flexible material and is adapted to partially enclose the plug member 43 while having a sliding fit with the inner surface of the housing 15 to provide a fluid tight seal and also to divide the housing into compartments A and B. The free ends of the rods 32 have washers 44 and nuts 45 threaded thereon for retaining the plate 33 in engagement with the end 34 of the tubes or sleeves 31 while also holding the disc member 41, the washer 42 and plug member 43 together as a valve actuating unit or member in engagement with the end 40 of the sleeves 31. Thus the tubes 31 and rods 32 which carry the disc member 41, washer 42 and plug member 43 together with the plate 33 carrying the closure member 37 are capable of moving as a unit with respect to the valve body 27 due to the sliding fit of the tubes within the valve body.

The face of the plug member 43 adjacent the cup washer 42 is formed with a recess or bore 47 that is counterbored to provide a chamber 48 and to define an annular tapered shoulder 49. The washer 42 and disc member 41 are formed with apertures 50 and 51, respectively, which are disposed in aligned relation with the recess 47. A check valve 52 having a stem 53 is positioned in the chamber 48 with the stem 53 arranged to extend through the apertured washer 42 and disc member 41. The apertures 50 and 51 in the washer 42 and disc member 41 are of a greater diameter than the valve stem 53 so as to enable the valve stem to have a free reciprocatory movement therethrough and also to permit air and water to flow around said valve stem and through said apertures into the chamber 48. A spring 54 is positioned in the chamber 48 with one end seated in the recess 47 and the other end engaging the check valve 52 for urging and retaining the valve in engagement with the washer 42 and thus closing or sealing the chamber 48 with respect to the apertures 50 and 51. The annular shoulder 49 in the chamber 48 is designed to limit the movement of the check valve 52 within the chamber. The plug member 43 is formed with an inclined passageway 55, Figure 4, which terminates at one end in the chamber 48 and at the other end in the outer face of the plug member 43 so as to provide communication between the chamber 48 and the interior of the tubular housing 15.

A coil spring 57 is interposed between the disc member 41 and valve body 27 and is arranged to encircle the stem 53 of the check valve 52. One end of the spring 57 engages the disc member 41 while the other end is positioned within a conical recess 58 formed in the valve body 27. The coil spring 57 normally retains the valve mechanism in a closed or sealing position urging disc member 41 away from valve body 27 which action, through rods 32 and sleeves 31, seals the outlet port 38 by means of the closure member 37.

The valve as shown in Figures 2 and 4 is in a closed position so that when fluid or air is delivered under pressure, to the portion of the housing 15 designated A the air will not pass through port 38 and exhaust fitting 22. With the valve in this position the fluid or air entering the housing 15 will flow around and past the valve body 27 due to the hexagonal shape of the valve body. As the air flows past the valve body 27 it will be prevented from passing the valve actuating member due to the engagement of the washer 42 with the housing 15, thus the air will flow through the apertures 50 and 51 in the washer 42 and disc member 41. The air flowing through the apertures 50 and 51 will unseat check valve 52 thereby compressing spring 54 due to the air stream being under sufficient pressure to overcome the action of spring 54. Upon unseating valve 52 the air stream will flow into chamber 48 and then through passage 55 into the portion of the housing 15 designated B and towards bushing 17. The housing 15 may have a suitable plug threaded in bushing 17 to prevent the air passing out of the housing so that the air in the portions A and B of the housing will become equalized at which time the spring 54 will seat the check valve 52 thus closing the passage 55.

When the pressure of the air in the portion A of the housing 15 drops or is lowered, due to a decrease in pressure of the air flowing through bushing 16, the valve actuating member will be moved to open the valve port 38. This opening of the valve port 38 occurs, when the pressure in portion B of the housing is greater than in portion A, at which time the valve actuating member is moved towards the valve body 27 causing spring 57 to be compressed and valve stem 53 to bottom in recess 58 thereby unseating check valve 52 as shown in Figure 3. This movement of the valve actuating member causes valve disc 37 to be moved away from port 38 allowing air to flow through port 38 into recess 26 and then out through the exhaust fitting 22. The air contained in portion B of housing 15 will flow through passage 55 into chamber 48 then around valve 52 and through apertures 50 and 51 into portion A of housing 15 and finally through port 38. Any moisture that may have been carried by the air stream flow from portion A to portion B of the housing 15 will be entrapped in portion B. Thus upon the movement of the valve actuating member to open port 38 the moisture or water in portion B will be forced through passage 55 and apertures 50 and 51 by the air stream and finally carried through port 38 and out through exhaust fitting 22. When the pressure of the air in portion B of the housing 15 drops to such a point as not to be able to retain the valve actuating member in its valve port opening position spring 57 will return the valve actuating member to its inoperative position thus closing port 38 with valve disc 37.

There is shown diagrammatically in Figure 1 a typical humidifying system wherein valve 60 is interposed in a compressed air supply line 61. The valve 60 is opened and closed by a suitable valve actuating mechanism 62 for controlling the stream of air flowing through pipe 61. The air supply line 61 has a branch line 63 connected thereto, and while only one branch line is shown it will be understood that in actual usage many more branch lines are employed. The branch line 63 has a plurality of atomizer heads 64 of any suitable type connected thereto, at spaced intervals, by suitable fittings 65.

The portion of Figure 1 shown in broken lines denotes a high pressure system wherein pressure reducing valve 76 controls the flow of water under pressure through pipe 77 which pipe is connected to the atomizer heads 64 by suitable connections 78. In as much as the valve of the present invention functions equally as well with a low presure system as with a high pressure system this description will be limited to the low pressure system shown in full lines in Figure 1.

Normally hand operated blow-off valves are located at the ends of the branch line 63 but in Figure 1 there are shown the valves 15 of the present invention. The valve shown on the left of Figure 1 has a plug 66 secured in bushing 17 and the blow-off or exhaust fitting 22 projecting from the housing. The valve shown on the right of Figure 1 has an extension pipe 67 secured in bushing 17 with a pipe cup 68 on the end of the pipe. There is also shown a blow off pipe 69 secured to the exhaust fitting 22 which blow off pipe may extend to some point outside of the building where it terminates with an open end.

The atomizer heads 64 are connected by tubes or branch pipes 70 to a water line 71 which in turn is connected to a water tank 72. The tank 72 has a water inlet pipe 73 with a float control valve 74 associated therewith for maintaining the water at a predetermined level.

Normally the valves 15 at the ends of line 63 are in their closed position, such as shown in Figure 2, so that air flowing through pipe line 63 under pressure to the atomizer heads 64 will draw water through pipes 70 and due to the Venturi construction of the atomizer heads the water will be ejected as a mist or vapor. During this period of operation air with entrained water will be building up in line 63 and consequently enter valve housing 15 filling portions A and B of the housing in the manner described heretofore. Thus upon the actuation of valve 60 the air stream will be cut off in line 61 and only a portion of the air in line 63 will enter the atomizer heads 64 and be ejected due to a gradual decrease in the pressure in line 63. When this occurs the pressure of the air in portion B of the valve housing 15 will be greater than in portion A and line 63 so that the valve actuating member will be moved towards the valve body 27 and gradually open port 38. As soon as port 38 is cracked or opened slightly the air and entrained moisture in line 63 and portion A of housing 15 will rush out through port 38, recess 26 and exhaust fitting 22 thereby causing a sudden decrease in pressure in portion A of the housing 15. This sudden decrease in portion A will cause the valve actuating member to be suddenly thrust or snapped all the way over towards the valve body 27 completely opening port 38. This snap action of the valve actuating member is due to the pressure of the air in portion B of the housing 15 so that when the valve actuating member is moved into engagement with the valve body 27 the check valve stem 53 will be bottomed in recesss 58 causing check valve 52 to be unseated. The actuation of check valve 52 enables the air and entrained moisture in portion B of the housing to flow through passage 55, apertures 50 and 51 and into portion A of the housing and finally through port 38. In as much as slot or passage 55 is relatively small the escape of air from portion B of the housing 15 will be very slow and gradual thus retaining the valve in an actuated or open position for a long period which will insure a complete exhausting of the air line 63.

In the event that the air line 63 is of great length an extension 67 may be secured to the valve housing which pipe will increase the air volume capacity of portion B of the housing and thus insure the retention of the valve in an open position for a longer period of time.

I claim:

1. A valve comprising a body member having a port and an outlet passage in communication, a plurality of rods slidably mounted in said body, a valve disc mounted on one end of said rods, a valve actuating member mounted on the other end of said rods, a spring interposed between said body and actuating member for urging said valve disc into engagement with said port and said actuating member away from said body.

2. A valve comprising a body member having a port and an outlet passage in communication, a plurality of tubes slidably mounted in said body and arranged to extend beyond said body, rods mounted in said tubes and adapted to project beyond the ends of said tubes, a plate supported on said rods in engagement with an end of said tubes, a valve disc on said plate for closing said port, a valve actuating member mounted on said rods in engagement with the other end of said tubes, a spring actuated check valve in said actuating member, a stem on said check valve arranged to engage said body member for unseating said check valve and a spring interposed between said actuating member and body member for normally retaining said actuating member and body member in spaced relation while closing said port with said valve disc and allowing said check valve to seat.

3. In a valve, a housing having an inlet, an outlet fitting mounted in said housing, a body member secured to said outlet fitting within said housing, said body member having a port in communication with said outlet fitting, rods slidably mounted in said body member and arranged to extend beyond the ends of the body member, a disc member mounted on one end of said rods and adapted to engage said body member for closing said port, an actuating member mounted on the other end of said rods, said actuating member including a resilient member arranged in sealing engagement with said housing and means interposed between said actuating member and body member for normally retaining said disc member in engagement with said body member.

4. In a valve, a housing having an inlet opening, a body member having a recess therein, an outlet fitting in said housing arranged to extend into said recess for securing said body member to the housing, said body member having a port therein communicating with said recess, rods slidably mounted in said body member, a disc member mounted on said rods for engaging said body member to close said port, an actuating member mounted on said rods with a portion thereof engaging said housing and defining a plurality of compartments in the housing, said actuating member having a passage therethrough providing communication between the compartments in said housing and means in said housing engaging said body member and actuating member for normally retaining said disc member in engagement with said valve body.

5. In a valve, a housing having an inlet opening, a body member having a recess therein, an outlet fitting in said housing arranged to extend into said recess for securing said body member to the housing, said body member having a port therein communicating with said recess, rods slidably mounted in said body member, a disc member mounted on said rods and normally engaging said body member to close said port, an actuating member mounted on said rods and having a portion thereof engaging said housing to define a plurality of compartments in the housing, said actuating member having a passage therethrough providing communication between the compartments in said housing, a check valve in said actuating member for closing said passage, said actuating member upon its initial movement opening the port in said body member and means on said check valve engageable with said body member for unseating said check valve upon the continued movement of said actuating member.

6. In a valve, a tubular housing having an inlet opening, a hexagonal shaped body member in said housing with the sides of said body member being spaced from said housing and defining passageways, an outlet fitting in said housing engaging said body member for securing the body member to the housing, said body member having a port therein communicating with said outlet fitting, rods slidably mounted in said body member, a disc member mounted on said rods and normally engaging said body member to close said port, an actuating member mounted on said rods and adapted to move said disc member into and out of engagement with said port, said actuating member having a portion thereof engaging said housing to provide a fluid tight seal therewith and to define a plurality of compartments within the housing, said actuating member having a passage therethrough providing communication between the compartments in said housing, a spring actuated check valve in said actuating member for closing said passage, a stem on said check valve adapted to engage said body member for unseating the check valve and spring means normally retaining said actuating member and body member in spaced relation for closing said port and passage.

7. In a humidification system embodying a valve controlled air pressure supply pipe line and a water supply pipe line, a branch pipe line connected to said air supply pipe line, a plurality of atomizer heads connected to said branch pipe line and water supply pipe line at spaced intervals for ejecting a fine mist, a blow off valve connected to said branch pipe line comprising a tubular housing having an inlet opening in one end and a plug in the other end, a body member having a recess therein positioned within said housing, an outlet fitting in said housing arranged to extend into said recess for securing said body member to the housing, said body member having a port therein communicating with said recess, the port in said body member affording communication between said outlet fitting and said branch pipe line through the inlet opening in said housing, rods slidably mounted in said body member, a disc member mounted on said rods and normally engaging said body member to close said port, an actuating member mounted on said rods and having a portion thereof arranged in sealing engagement with said housing to define a plurality of compartments in the housing, said actuating member having a passage therethrough providing communication between the compartments in said housing, a check valve in said actuating member for closing said passage, spring means interposed between said actuating member and body member for normally retaining said body member and actuating member in spaced relation and said disc member in engagement with said body member, said branch pipe line adapted to deliver an air stream under pressure to said housing, with the air stream unseating said check valve and allowing the air stream to flow through the passage in said actuating member, a spring in said actuating member engageable with said check valve for seating the check valve when the air pressure in the compartments of said housing becomes uniform, and said actuating member adapted to be urged towards said body member for opening the port in said body member upon a reduction of air pressure in the branch pipe line.

8. In a humidification system embodying a valve controlled air pressure supply conduit and a water supply conduit, a branch conduit connected to said air supply conduit, a plurality of atomizer heads connected to said branch conduit and water supply conduit at spaced intervals for ejecting a fine mist, a blow off valve connected to said branch conduit comprising a tubular housing having an inlet opening in one end thereof and a plug member in the other end thereof, a hexagonal shaped body member in said housing, with the sides of said body member being spaced from said housing and defining passageways, an outlet fitting in said housing engaging said body member for securing the body member to the housing, said body member having a port therein communicating with said outlet fitting, rods slidably mounted in said body member, a disc member mounted on said rods and normally engaging said body member to close said port, an actuating member mounted on said rods and adapted to move said disc member into and out of engagement with said port, said actuating member having a portion thereof engaging said housing to provide a fluid tight seal therewith and to define a plurality of compartments within the housing, said actuating member having a passage therethrough providing communication between the compartments in said housing, a spring actuated check valve in said actuating member for closing said passage, a stem of said check valve adapted to engage said body member for unseating the check valve, spring means interposed between said actuating member and body member for normally retaining said actuating member and body member in spaced relation, said branch conduit adapted to deliver an air stream under pressure to said housing for unseating said check valve and permitting the air stream to flow into the compartments in said housing until the air pressure in said compartments is uniform, said actuating member being urged towards said body member upon reducing the air pressure in said branch conduit, whereby said check valve is unseated and said port is opened to provide communication between the compartments of said housing and the outlet fitting.

LONNIE A. DICKENS.

REFERENCES CITED

The following references are of record in the file of this patent:

UNITED STATES PATENTS

| Number | Name | Date |
|---|---|---|
| 1,466,804 | Orr | Sept. 4, 1923 |
| 1,766,268 | Swoyer | June 24, 1930 |
| 1,935,874 | Davis | Nov. 21, 1933 |